United States Patent [19]

Rex

[11] 4,018,399
[45] Apr. 19, 1977

[54] AUTOMATIC LOCKING DEVICE FOR A VEHICLE SAFETY BELT

[76] Inventor: Gert Ingmar Rex, 84 Stenhuggarvagen, 302 40 Halmstad, Sweden

[22] Filed: May 7, 1975

[21] Appl. No.: 575,250

Related U.S. Application Data

[63] Continuation of Ser. No. 386,380, Aug. 7, 1973, abandoned.

[30] Foreign Application Priority Data

Aug. 9, 1972 Sweden .......................... 10354/72

[52] U.S. Cl. .................. 242/107.4 A; 242/107.4 B
[51] Int. Cl.² .................. A62B 35/02; B65H 75/48
[58] Field of Search ............ 242/107.4 R, 107.4 A, 242/107.4 B; 297/388; 280/744–747; 200/61.48–61.52; 188/135, 139

[56] References Cited

UNITED STATES PATENTS

| | | | |
|---|---|---|---|
| 2,768,256 | 10/1956 | Barecki et al. ................ | 200/61.48 |
| 3,226,053 | 12/1965 | Petty .......................... | 242/107.4 A |
| 3,430,891 | 3/1969 | Burleigh ...................... | 242/107.4 A |
| 3,552,676 | 1/1971 | Weber ......................... | 242/107.4 A |
| 3,578,260 | 5/1971 | Kell ............................ | 242/107.4 A |
| 3,593,942 | 7/1971 | Rex ............................ | 242/107.4 A |
| 3,722,824 | 3/1973 | Hayashi ....................... | 242/107.4 A |
| 3,758,044 | 9/1973 | Nilsson ....................... | 242/107.4 A |
| 3,838,831 | 10/1974 | Bell ............................ | 242/107.4 A |
| 3,850,383 | 11/1974 | Lewis ......................... | 242/107.4 A |

*Primary Examiner*—Stanley N. Gilreath
*Assistant Examiner*—John M. Jillions
*Attorney, Agent, or Firm*—Shlesinger, Fitzsimmons & Shlesinger

[57] ABSTRACT

A spring-loaded safety belt for automobiles, and the like, has a rotatable shaft for winding up the belt, and a rotatable inertia disc which effects locking of the shaft whenever the shaft and disc are rotated relative to one another. A pendulum-type member is suspended adjacent the disc to be swung in any direction about a vertical axis only when the acceleration or deceleration of the associated vehicle in any direction exceeds a predetermined value — e.g., 0.3g (gravity). Whenever the pendulum member is swung, and regardless of the direction, it pivots a hook member which engages a tooth on the inertia member to hold the latter motionless during withdrawal of the belt and rotation of the wind-up shaft thereby triggering the locking mechanism to halt further unwinding of the belt.

8 Claims, 9 Drawing Figures

AUTOMATIC LOCKING DEVICE FOR A VEHICLE SAFETY BELT

This is a continuation of application Ser. No. 386,380, filed Aug. 7, 1973, now abandoned.

The present invention relates to safety belts, and more particularly to an automatic locking device for a safety belt of the reel type that is intended to retain a person in a vehicle, primarily a car.

Belts of the type described include a shaft rotatably mounted in a stationary casing in a vehicle, and a spring for reeling up the belt on the shaft. When a change of the speed of the vehicle exceeds a predetermined g-value, a pendulum-type member actuates a yoke so as to cause said yoke to pass from a position of rest into a locking position with one arm engaging locking mechanism associated with the shaft.

The invention has for its main object to provide an automatic locking device of the type which is releasably held in an inactive position as long as the changes of speed of the vehicle remain below a relatively low g-value such as 0.3g, but which practically instantaneously locks the belt when this value is exceeded, so that the unreeling thereof is stopped at once, and the person using the belt is thus immediately retained in place by the belt.

According to another essential object of the invention this release of the automatic locking device has to take place in response to any sudden movement of the vehicle, irrespective of the direction of said movement, and including response to a lateral collision, as soon as a predetermined g-value has been reached or exceeded. A diagram representing the g-value for release of the automatic locking device thus will closely follow a circular line about the point indicating the position of rest of the pendulum member.

These and other objects, as well as characterizing features of the invention, and also advantages obtained therewith, will become apparent from the following detailed description of an embodiment of the invention, which is shown by way of example in the accompanying drawings, of which;

FIG. 3A shows a detail of the yoke in FIG. 3 as viewed from below;

Figure 1:
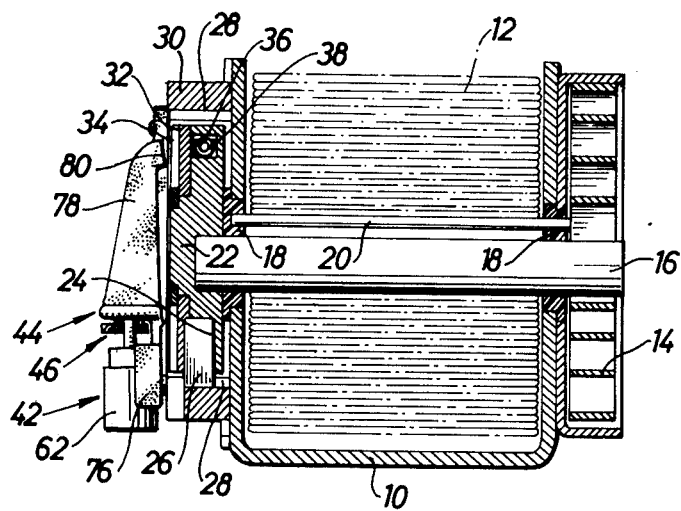
FIG. 1 is a longitudinal sectional view taken along the line I—I of FIG. 2 through an automatic locking device constructed according to one embodiment of the invention.

Referring now to the drawings and the embodiment shown therein, reference numeral 10 denotes a U-shaped casing of an automatic locking device for a safety belt 12. This belt consists of a strap which by means of a coil spring 14 can be reeled or wound upon a shaft 16. The ends of said shaft are mounted in bushings 18, which are rotatably mounted in recesses formed in the casing 10. A rod 20 is supported by the bushings 18 in spaced, parallel relation to the shaft 16, and constitutes an attachment for the inner end of the strap 12. Furthermore, the spring 14 is attached at its inner end to said rod.

Figure 2:
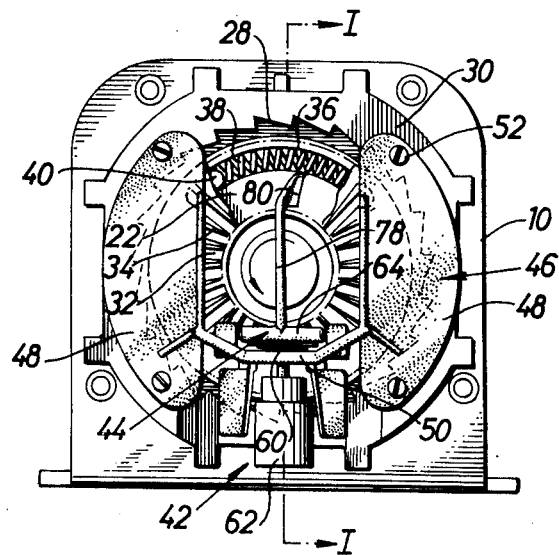
FIG. 2 shows this locking device viewed from one side but with its front cover plate removed.

Secured to that end portion of the shaft 16 which is located remote from the spring 14, and outside of the casing 10, is a circular, disc-shaped lock casing or rotor 22. In the illustrated embodiment rotor 22 has a recess 24 housing a locking pawl 26. The pawl 26 cooperates with locking teeth 28 formed in the inner periphery of a crown 30 surrounding the rotor and fixed to the casing 10. An inertia-responsive disc 32 is freely rotatable on the rotor 22, and on its outer face has formed about its circumference radially extending locking teeth 34. Housed in a groove 36 extending in the rotor 22 over a portion of a circular line is a coil spring 38. A pin 40 projects from the disc 32 into the groove 36 so as to bear against one end of the spring 38. In FIG. 2 an upper portion of the disc 32 has been cut away in order to make the parts 38 and 40 clearly visible.

The locking device as so far described is known from, e.g., the U.S. Pat. No. 3,593,942, and thus does not constitute any specific novelty as far as the present invention is concerned. The rotor 22 and the inertia-responsive disc 32 are coupled together via the members 38, 40 in such a manner that if the belt 12 intentionally is unreeled with a speed below a relatively high velocity, the rotor 22 carries the disc 32 with it over the members 38, 40 without any locking action being initiated; whereas, as soon as this predetermined speed of e.g., 0.6 to 1.0 g is exceeded, the disc 32 will lag behind and cause the spring 38 to become compressed. The relative angular displacement produced thereby causes the locking pawl 26 to enter into one of the recesses between two of the locking teeth 28, whereby the belt is locked against further unreeling.

If the vehicle instead is subjected to a change in speed, such as a braking force exceeding a predetermined g-value, an arm will engage a locking tooth 34 of the disc 32 in a manner to be described in more detail hereinafter so that the movement of said disc is slowed down or stopped, and an angular displacement is caused between the disc and the rotor 22, which causes the locking pawl 26 to be conveyed outwards into engagement with a locking tooth 28 in the casing 10, which is rigidly secured on the frame of the vehicle. Thus, the belt 12 is also now prevented from unreeling, and the person retained by the belt is prevented from being thrown ahead in the vehicle.

The locking in response to a change in speed of the vehicle becomes effective at substantially lower speeds of unreeling of the belt than when this belt is unreeled intentionally. For a more detailed description of the function and manner of operation of an automatic locking device of the type described, reference is made to, e.g., the above cited U.S. Pat. No. 3,593,942. In this connection it should be observed that the present invention in no way is bound to the details of said known structure.

The device which releases the automatic locking device, when a predetermined change of speed of the vehicle is exceeded, consists of a pendulum member and a yoke generally denoted 42 and 44, respectively, both of which are mounted in a bracket 46, which is rigidly connected with the stationary casing 10, 30. The bracket 46 is composed of two wings or blades 48 interconnected by a bridge member 50 and rigidly secured onto the casing 10 by means of screws 52.

Figure 3:
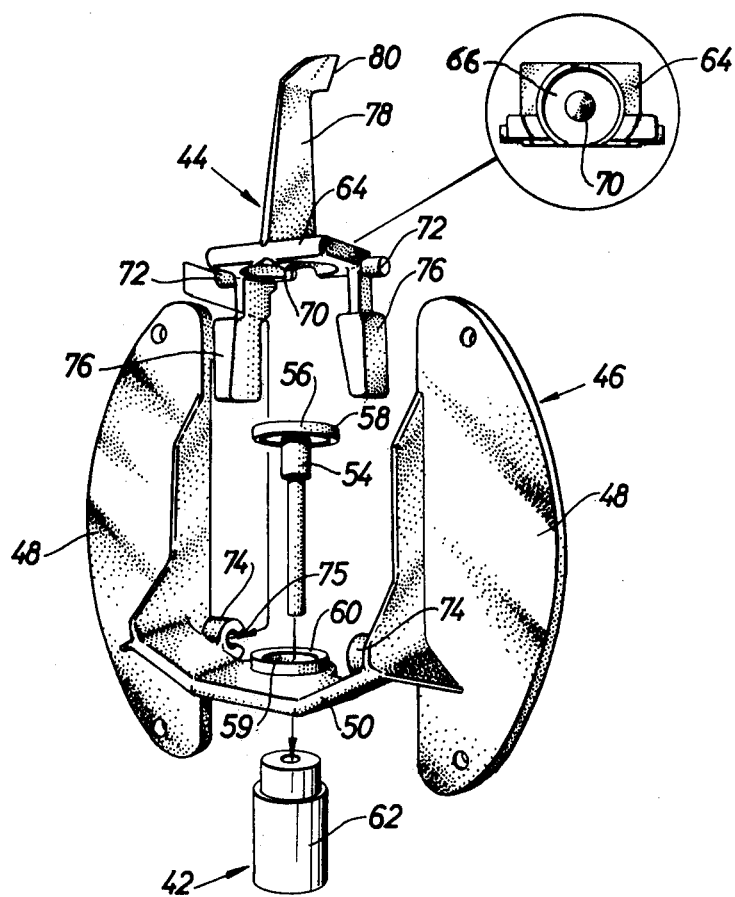
FIG. 3 is an exploded perspective view on a slightly enlarged scale of part of this device, and showing its pendulum member, a yoke and elements supporting these members.

The pendulum member 42 (see especially FIG. 3) comprises a pin 54 which at its top has the form of a circular disc 56 having a downwardly bent annular edge 58. The bridge member 50 of the bracket 46 has a central opening 59 which at its top is surrounded by a circular ring-shaped flange 60. The pin 54 passes through said opening, and below the opening is fixedly secured in an axial bore of a metal weight 62, such as lead. The rest of the pendulum member, as well as the yoke 44 and the bracket 46, preferably are made of some suitable plastic material.

Figure 4:
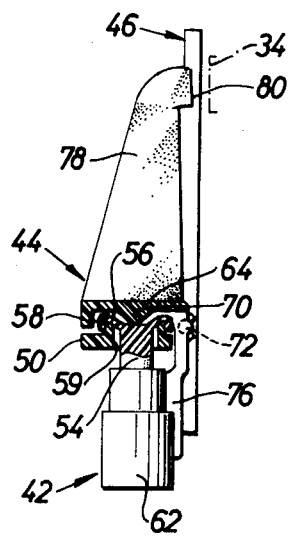
FIGS. 4 to 6 are side views of the parts shown in FIG. 3, and illustrating these parts in three different relative positions.

The disc 56 normally has its downwardly bent edge 58 seated over the flange 60, whereby the pendulum member is suspended from member 50, and so that when member 42 is in its position of rest, or neutral position as illustrated in FIG. 4, flange 60 bears against the underside of disc 56 about the circumference thereof. Due to this kind of suspension the pendulum member 42 is capable of swinging out in all directions from its position of rest, which enables the pendulum member to react to sudden changes of speed of the vehicle in the form of deceleration or acceleration acting on the vehicle from any direction. A vertical line through the center of gravity of the pendulum member 42 passes through the center of the annular abutting surface on the disc 56 and the flange 60, respectively. Consequently the pendulum member cannot start a swinging movement prior to the instant when a change of speed has reached such a value that inertia is capable of overcoming that moment which is represented by the radial distance of the bearing edge 58 from the center line of the pendulum member 62 and by the weight of said member. As a further consequence, the automatic locking device does not react on normal changes of speed associated with normal acceleration, braking and similar changes and also on normally occurring angles of inclination of the roadway such as below about 15 percent.

The yoke 44 is composed of a flat central portion 64 which in its bottom side has an annular recess 66 (FIG. 3A). In addition, the portion 64 has a central conical-shaped projection 70, which, accordng to the invention, bears against the center of the pendulum disc 56. The flat portion 64 has two bearing pins 72 each entering into its associate bearing bushing 74 in the bracket 46. The bushings 74 have oblique downwardly facing openings 75 through which the bearing pins 72 can be pressed thanks to the elasticity of the plastic material of which the bushings are made.

Figure 5:
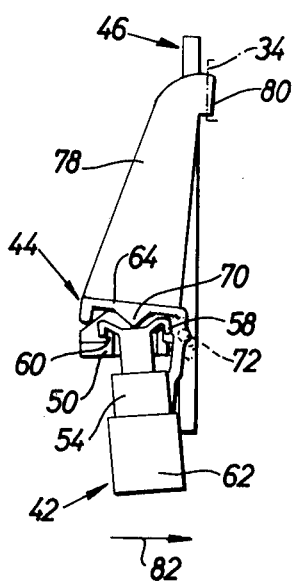
Figure 6:
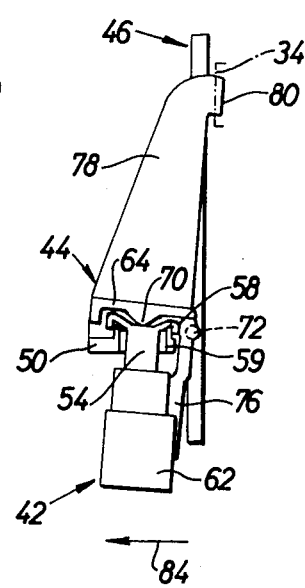

The common axis of the pins 72 extends transversally or almost transversally to the central axis of the pendulum member 42 when it is in its starting or inactive position; and the common axis of the bushings 74 is located in laterally spaced relation to the point of the conical projection 70, which spacing is greater than the radius of the circular tipping edge of the pendulum member 42. Two weight arms 76 suitably made of plastic material project downwardly from the central portion 64 on either side of the pendulum member 42, and behind the bridge member 50 of the bracket. The distribution of weight in the yoke 44 is such that the yoke in all positions tends to swing counter-clockwise about its pins 72 as illustrated in FIGS. 4 to 6 so that the point 70 always will bear against the disc 56 of the pendulum member.

An arm 78 projects upwardly from the center of the central portion 64 and has its upper, free end formed with a hook-shaped portion 80. The hook 80 is arranged radially opposite the locking teeth 34 of the inertia-responsive disc 32, and has the same function as the locking hook 28 shown in the U.S. Pat. No. 3,593,942, referred to above.

The above-described locking device is operated in the following manner: When the vehicle, especially a car, is at rest, or driven under normal conditions, the pendulum member 42 is in its inactive or neutral position according to FIG. 4. The disc 56 of the pendulum member bears about its circumference against the flange 60 of the bracket 46. The yoke 44 which is mounted pivotally about the pins 72 bears with its central portion 70 against the pendulum member disc. When the vehicle is subjected to normal changes of speed such as during acceleration or application of the brakes, the pendulum member 42 cannot swing outwards since the moment produced by its suspension in the disc is not overcome. Not earlier, but when a predetermined value for the change of speed of the vehicle, such as 0.3g, is exceeded, the pendulum member is caused to swing out from its inactive or neutral position, thereby causing the central portion of the disc 56 to be raised, and causing the yoke 44 to be swung clockwise, (FIGS. 4 to 6), resulting in the arm 78 engaging one of the teeth 34 on the disc 32. Arm 78, which is made of plastic material, is laterally flexible so that it can yield until the hook 80 has reached its locking position with the nearest locking tooth. Now the disc 32 is stopped so that the locking pawl 26 can be conveyed outwards to engagement with a locking tooth 28, whereafter the belt 12 is locked.

It is easily understood that the moment, which the inertia-forces acting on the pendulum member 42 must overcome in order to cause the pendulum member to take an inclined position, also includes the counter-moment of the yoke 44, which bears against the center of the pendulum member disc. This counter-acting moment is, however, substantially less than the moment produced by the pendulum member, because the yoke is made entirely of a light material, such as plastic material, for example.

According to the invention a release of the automatic locking device is effected as soon as the predetermined relatively low g-value has been reached or exceeded through a force acting from any direction, i.e., irrespective from where the action on the vehicle is arriving. This is illustrated by the FIGS. 5 to 8. In FIG. 5 it is assumed that the vehicle is subjected to a reduction of its speed exceeding the predetermined minimum g-value in the direction 82 of drive of the vehicle. The pendulum member 42 swings outwards in the direction of drive about the left-hand edge of the tipping flange 60, the central portion of the disc 56 rising and carrying with it the point 70 of the yoke 44 so that the yoke is turned in clockwise direction and the hook 80 of the arm 78 caused to engage one of the locking teeth 34. On a change of speed exceeding the predetermined g-value in the direction 84 according to FIG. 6, e.g., if a car is run into from behind, the pendulum member with its disc 56 will tip about the right-hand edge of the flange 60; but in this case also the central portion of the disc is raised and takes with it the bearing point 70 of the yoke so that the yoke will make the same swinging movement as in the preceding case, which means that the arm 78 of the yoke is caused to engage the disc 32.

Figure 7:
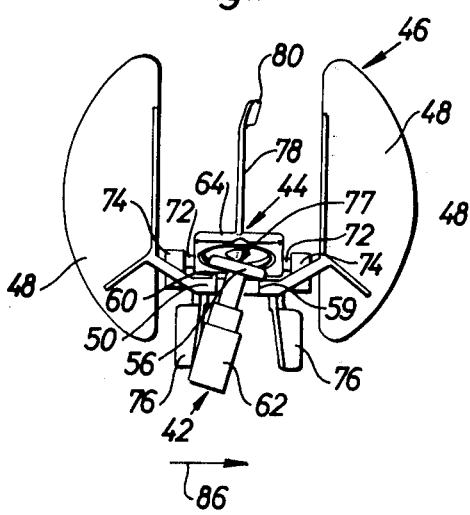
FIGS. 7 and 8 are front elevational views of these same parts in two additional positions relative one another.
Figure 8:
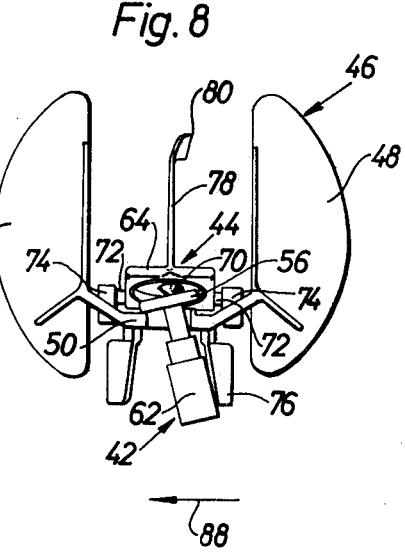

FIGS. 7 and 8 show the course of events when changes of speed in lateral direction are in consideration, e.g., when a car is run into from one side and is hurled in the directions indicated by the arrows 86 and 88, respectively. In these cases also, the pendulum member will swing about a point on the annular flange 60, the moment arm to the central portion of the disc each time being equally great. This central portion will be raised for one and the same g-value over practically the same distance, and the actuation of the yoke will always be effected in the same direction and with the same moment.

In all cases nothing will occur when the change of speed remains below the predetermined g-value, but as soon as this value is reached or exceeded an instantaneous release of the automatic locking device is effected so that the belt will only be unreeled for a very short portion before the person using the belt is perfectly retained. The mounting of the pendulum member according to the invention makes sure that it will remain unactuated when the vehicle, especially the car, takes an inclined position, e.g., when the roadway forms an angle to the horizontal plane.

The arm 78 is many times longer than the spacing from the point 70 to the center line of the bearing pine 72, for which reason the central portion of the disc 56 of the pendulum member need be raised only a slight distance in order that the hook 80 shall engage one of the locking teeth 34. As is evident from the patent specification referred to above, the arm 78 is subjected to very small stresses only, since it only switches over the locking mechanism into locking position, and thus does not absorb any of the forces acting on the belt 12 when the locking mechanism is applied.

Obviously, the invention is not limited to the shown embodiment, but may be varied in the widest sense within the scope of the basic idea thereof.

Having thus described my invention, what I claim is:

1. An automatic locking device for a safety belt of the type intended to retain a person in a vehicle, comprising
   a stationary casing in said vehicle,
   a shaft rotatably mounted in said casing for reeling up the belt,
   a locking mechanism actuatable, when a change of the speed of the vehicle exceeds a predetermined g-value, to lock said shaft against rotation in a belt releasing direction,
   a pendulum member supported on said casing to swing about a stationary tipping edge on said casing only when the change of speed of said vehicle exceeds said predetermined g-value, said edge being located in laterally spaced relation to a line passing through the center of gravity of the pendulum member,
   a yoke mounted on the casing above said pendulum member to pivot about an axis extending transverse to and laterally offset from said line, and having thereon an actuating arm for actuating said locking mechanism,
   said pendulum member engaging a lateral support on said yoke and operative upon said predetermined g-value being exceeded to swing about said tipping edge and pivot said yoke to cause its arm to actuate the locking mechanism,
   said lateral support comprising an annular surface on the bottom of the yoke,
   said annular surface having thereon a central projection bearing against the pendulum member,
   two bearing pins projecting laterally of said yoke for pivotally mounting the yoke on the casing,
   two weight arms on said yoke extending downwardly on either side of the pendulum member, and
   said actuating arm projecting centrally upwardly from the upper side of said lateral support on the yoke.

2. The automatic locking device as claimed in claim 1, wherein said bearing pins, said weight arms, and said actuating arm are made of plastic material.

3. An automatic locking device for a safety belt of the type intended to retain a person in a vehicle, comprising
   a casing fixedly secured in the vehicle,
   a shaft rotatably mounted in said casing,
   a belt wound on said shaft
   a coil spring secured at opposite ends to said shaft and casing for winding said belt on said shaft, and
   a locking mechanism actuatable, when change of speed of the vehicle exceeds a predetermined g-value, to lock said shaft against rotation, comprising
   a bridge member secured in said casing,
   a pendulum member mounted on said bridge member for universal movement thereon in all directions about points offset from a vertical line which passes through the center of gravity of said pendulum member when said pendulum member is at rest,
   a pivoted locking member mounted in said casing for pivotal movement about an axis extending transverse to and laterally offset from said vertical line,
   a cooperating locking member positioned to be engaged by said pivoted locking member,
   said pivoted locking member being disposed vertically above said pendulum member and having point contact therewith at a point substantially on said vertical line when said pendulum member is at rest, whereby, when the change of speed of the vehicle exceeds said predetermined g-value said locking member will be pivoted about its axis to engage said cooperating locking member,
   means connecting said cooperating locking member to said shaft,
   a locking pawl carried by said shaft and means on said casing engageable by said pawl to connect said shaft to said casing to hold said shaft against rotation when said pivoted locking member engages said cooperating locking member,
   said bridge member having an annular tipping edge concentric to said vertical line, and said pendulum member having an annular flange also concentric with said vertical line for suspending said pendulum member on said annular tipping edge for its universal movement in all directions,
   said pivoted locking member having a conical projection protruding from its bottom surface engaging the top surface of said pendulum member to provide the point contact of said pivoted locking member with said pendulum member, and
   said pivoted locking member being formed with a disc-shaped portion which on its bottom side has said conical projection bearing against said pendulum member, and being supported for its pivotal movement by two bearing pins disposed laterally of said projection and two weight arms extending downwardly on opposite sides, respectively, of said pendulum member, and said pivoted locking member projecting centrally upwardly from its disc-shaped portion.

4. An automatic locking device for a safety belt of the type intended to retain a person in a vehicle, comprising a casing fixedly secured in the vehicle,
a shaft rotatably mounted in said casing,
a belt wound on said shaft,
a coil spring secured at opposite ends to said shaft and casing for winding said belt on said shaft, and
a locking mechanism actuatable, when change of speed of the vehicle exceeds a predetermined g-value, to lock said shaft against rotation, comprising
a bridge member secured in said casing,
a cylindrical pendulum member suspended from said bridge member for universal movement thereon in all directions about points offset equally from a vertical reference line which passes through the center of gravity of said pendulum member when said pendulum member is at rest,
a pivoted movement about an axis extending transverse to and laterally offset from said vertical line,
a cooperating locking member positioned to be engaged by said pivoted locking member, and normally to be rotatable with said shaft,
said pivoted locking member being disposed vertically above said pendulum member and having on its underside a point disposed in contact with the upper end of said pendulum member coaxially thereof, when said pendulum member is at rest, whereby, when the change of speed of the vehicle exceeds said predetermined g-value said locking member will be pivoted about its axis to engage said cooperating locking member and retard its rotation, and
means engaging said cooperating locking member to lock said shaft against rotation in said casing when said cooperating locking member is retarded.

5. An automatic locking device as claimed in claim 4, wherein said bridge member has therein a hole the axis of which coincides with said vertical line, and said pendulum member has on its upper end an annular flange resting on said bridge member around said opening and operatively suspending said pendulum member in said opening for its universal movement in all directions.

6. An automatic locking device as claimed in claim 5 wherein
the pivotal axis of said locking member is offset to one side thereof, whereby gravity urges the locking member in a direction to hold said point in contact with the upper end of said pendulum member, and
the moment arm of the pivoted locking member from its point of support on said pendulum member to its pivotal axis is greater than the moment arm of the pendulum member from said tipping edge to the line through the center of gravity of said pendulum member.

7. An automatic locking device as claimed in claim 6 wherein the moment arm of said pivoted locking member to its point of engagement with said cooperating locking member is many times greater than said moment arm of said locking member from its point of support on said pendulum member to its pivotal axis.

8. The automatic locking device as claimed in claim 6, wherein the said pivoted locking member is made of plastic material and is substantially lighter than said pendulum member, and the moment exerted by the locking member on the pendulum member is substantially less than the moment which must be overcome to tilt the pendulum member from its position of rest.

* * * * *